United States Patent
Cui

(10) Patent No.: US 12,184,777 B2
(45) Date of Patent: Dec. 31, 2024

(54) AUTHENTICATION INFORMATION TRANSMISSION METHOD, APPARATUS, AND STORAGE MEDIUM

(71) Applicant: Tencent Technology (Shenzhen) Company Limited, Shenzhen (CN)

(72) Inventor: Qi Cui, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 32 days.

(21) Appl. No.: 17/018,559

(22) Filed: Sep. 11, 2020

(65) Prior Publication Data

US 2020/0412535 A1 Dec. 31, 2020

Related U.S. Application Data

(63) Continuation of application No. PCT/CN2019/100004, filed on Aug. 9, 2019.

(30) Foreign Application Priority Data

Aug. 16, 2018 (CN) .......................... 201810936092.2

(51) Int. Cl.
*H04L 9/08* (2006.01)
*H04L 9/32* (2006.01)

(52) U.S. Cl.
CPC .......... *H04L 9/0897* (2013.01); *H04L 9/0822* (2013.01); *H04L 9/3247* (2013.01)

(58) Field of Classification Search
None
See application file for complete search history.

(56) References Cited

U.S. PATENT DOCUMENTS 7,644,264 B1 * 1/2010 Olsen .................... G06F 9/4416
 719/321
9,183,361 B2 * 11/2015 Obasanjo ............ H04L 63/0807
(Continued)

FOREIGN PATENT DOCUMENTS

CN 104321666 A * 1/2015 ........... G01S 5/0027
CN 105488679 A * 4/2016
(Continued)

OTHER PUBLICATIONS

Extended European Search Report for Application No. 19849693.7 dated Apr. 23, 2021; 10 pages.
(Continued)

*Primary Examiner* — Saleh Najjar
*Assistant Examiner* — Shadi H Kobrosli
(74) *Attorney, Agent, or Firm* — Crowell & Moring LLP

(57) ABSTRACT

Embodiments of this disclosure provide an authentication information transmission method and system, a key management client, and a computer device. Performed by a device hosting a key management client and comprising a hardware abstract layer, the method includes receiving, through a path via a preset hardware abstract layer interface of the hardware abstract layer, authentication information from an application client associated with an application server; transmitting the authentication information to a key management server, so that the key management server transmits the authentication information to a trusted application in the device; obtaining authentication information signed by the trusted application and forwarded by the key management server; and transmitting, through the preset hardware abstract layer interface, the signed authentication information to the application server, so that the application server performs a validity check on the authentication information.

20 Claims, 8 Drawing Sheets

(56) References Cited

U.S. PATENT DOCUMENTS

| | | | | |
|---|---|---|---|---|
| 11,843,705 B2 * | 12/2023 | Fairfax | | G06F 21/44 |
| 2014/0068251 A1 * | 3/2014 | Ignaci | | H04L 9/006 |
| | | | | 713/158 |
| 2014/0289833 A1 * | 9/2014 | Briceno | | H04L 9/006 |
| | | | | 726/5 |
| 2016/0043870 A1 | 2/2016 | Avanzi | | |
| 2016/0086172 A1 * | 3/2016 | Kamal | | G06Q 20/3227 |
| | | | | 705/71 |
| 2017/0061441 A1 * | 3/2017 | Kamal | | G06Q 20/326 |
| 2018/0019986 A1 * | 1/2018 | Manohar | | H04W 12/06 |
| 2018/0053005 A1 * | 2/2018 | Kamal | | G06F 21/602 |
| 2018/0181739 A1 * | 6/2018 | Zhong | | G06F 21/62 |
| 2018/0285089 A1 * | 10/2018 | Khakpour | | H04W 12/084 |
| 2018/0331918 A1 * | 11/2018 | Woodmansee | | H04L 63/10 |
| 2019/0372950 A1 * | 12/2019 | McClure | | H04L 9/50 |
| 2020/0026857 A1 * | 1/2020 | Muller | | G06F 21/12 |

FOREIGN PATENT DOCUMENTS

| | | | | |
|---|---|---|---|---|
| CN | 105574720 A | * | 5/2016 | |
| CN | 106899551 A | * | 6/2017 | H04L 63/0853 |
| CN | 107038363 A | * | 8/2017 | G06F 21/32 |
| CN | 107066861 A | * | 8/2017 | G06F 21/32 |
| CN | 107066885 A | * | 8/2017 | |
| CN | 107067250 A | * | 8/2017 | |
| CN | 107133794 A | * | 9/2017 | G06Q 20/322 |
| CN | 107733636 A | * | 2/2018 | H04L 63/0407 |
| CN | 108282466 A | | 7/2018 | |
| CN | 109040088 A | | 12/2018 | |
| CN | 109960582 A | * | 7/2019 | G06F 21/53 |
| WO | WO 2016/057086 A2 | | 4/2016 | |

OTHER PUBLICATIONS

Sang-Min Lee et al., "General Purpose Hardware Abstraction Layer for Multiple Virtual Machines in Mobile Devices", Advanced Communication Technology, 2009, ICACT 2009, 11$^{th}$ International Conference on GIRI, Piscataway, NJ, USA, Feb. 15, 2009; pp. 362-364, XP031669602, ISBN: 978-89-5519-139-4 *p. 364 left-hand column*.

Supplemental European Search Report for Application No. 19849693.7 dated May 12, 2021; 1 page.

Office Action with English Translation of Concise Explanation of Relevance for Chinese Patent Application No. CN201810936092.2 dated Mar. 25, 2021; 7 pages.

International Search Report and Written Opinion with English Translation for International Patent Application No. PCT/CN2019/100004 dated Oct. 30, 2019; 12 pages.

* cited by examiner

AUTHENTICATION INFORMATION TRANSMISSION METHOD, APPARATUS, AND STORAGE MEDIUM

RELATED APPLICATION

This application is a continuation application of the International PCT Application No. PCT/CN2019/100004, filed with the China National Intellectual Property Administration, PRC on Aug. 9, 2019 which claims priority to Chinese Patent Application No. 201810936092.2, entitled "AUTHENTICATION INFORMATION TRANSMISSION METHOD AND SYSTEM, KEY MANAGEMENT CLIENT, AND COMPUTER DEVICE" and filed with the China National Intellectual Property Administration, PRC on Aug. 16, 2018, which are incorporated herein by reference in their entireties.

FIELD OF THE TECHNOLOGY

This disclosure relates to the field of communication technologies, and in particular, to a method, a system, a key management client, a computer device, and a computer-readable storage medium for authentication information transmission.

BACKGROUND OF THE DISCLOSURE

At present, when a user pays by using a third-party application in a terminal device such as a mobile phone or a computer, or opens a private file or application in a terminal device such as a mobile phone or a computer, it is often necessary to use a security authentication technology to verify biometric authentication information such as a face or a fingerprint, to verify the identity of the user.

Usually, a third-party application client may transmit the biometric authentication information to a corresponding application server for verification, to implement functions such as making a payment and opening a private file or application after the application server verifies the validity.

SUMMARY

Embodiments of this disclosure provide a method, a system, a key management client, a computer device, and a computer-readable storage medium for authentication information transmission.

According to one aspect, an embodiment of this disclosure provides a method for authentication information transmission, performed by a computing device hosting a key management client, the method including: receiving, by the key management client through a preset hardware abstract layer interface of the computing device, authentication information transmitted by an application client running in the computing device and associated with an application server; transmitting, by the key management client, the authentication information to a key management server, so that the key management server transmits the authentication information to a trusted application in a trusted execution environment in the computing device; obtaining, by the key management client, authentication information signed by the trusted application and forwarded by the key management server; and transmitting, by the key management client through the preset hardware abstract layer interface, the signed authentication information to the application server, so that the application server performs a validity check on the authentication information.

According to another aspect, an embodiment of this disclosure provides an apparatus for authentication information transmission, hosting a key management client, the apparatus further comprising a memory for storing computer instructions and a processor in communication with the memory, wherein, when the processor executes the instructions, the processor is configured to cause the key management client to: receive through a preset hardware abstract layer interface of the apparatus, authentication information transmitted by an application client running in the apparatus and associated with an application server; transmit the authentication information to a key management server, so that the key management server transmits the authentication information to a trusted application in a trusted execution environment in the apparatus; obtain authentication information signed by the trusted application and forwarded by the key management server; and transmit through the preset hardware abstract layer interface, the signed authentication information to the application server, so that the application server performs a validity check on the authentication information.

According to still another aspect, an embodiment of this disclosure provides another method for authentication information transmission, the method including: receiving, by a key management client through a system service interface, an authentication information acquiring request transmitted by an application client; encapsulating, by the key management client, the authentication information acquiring request as a hardware abstract layer interface instruction, and transmitting the hardware abstract layer interface instruction to a key management server through a hardware abstract layer interface, so that the key management server transmits the authentication information acquiring request to a trusted application in a trusted execution environment; receiving, by the key management client, an instruction result of a hardware abstract layer from the key management server, the instruction result of the hardware abstract layer including authentication information signed by the trusted application; and extracting, by the key management client, the signed authentication information from the instruction result of the hardware abstract layer, and transmitting the signed authentication information to an application server corresponding to the application client, so that the application server performs a validity check on the authentication information.

According to yet another aspect, an embodiment of this disclosure provides a computer device, including a memory, a processor, and a computer program stored on the memory and executable by the processor, the program, when executed by the processor, implementing the method for authentication information transmission according to the foregoing embodiments.

According to yet another aspect, an embodiment of this disclosure provides a system for authentication information transmission, including an application client, an application server, a key management server, a trusted application, and a key management client according to the foregoing embodiments.

According to yet another aspect, an embodiment of this disclosure provides a computer-readable non-transitory storage medium, storing a computer program, the program, when executed by a processor, implementing the method for authentication information transmission according to the foregoing embodiments.

It is to be understood that the foregoing general descriptions and the following detailed descriptions are only exemplary and explanatory, and cannot limit this disclosure.

BRIEF DESCRIPTION OF THE DRAWINGS

Accompanying drawings herein are incorporated into a specification and form a part of this specification, showing embodiments that conform to this disclosure, and are used to describe a principle of this disclosure together with this specification.

Figure 1:
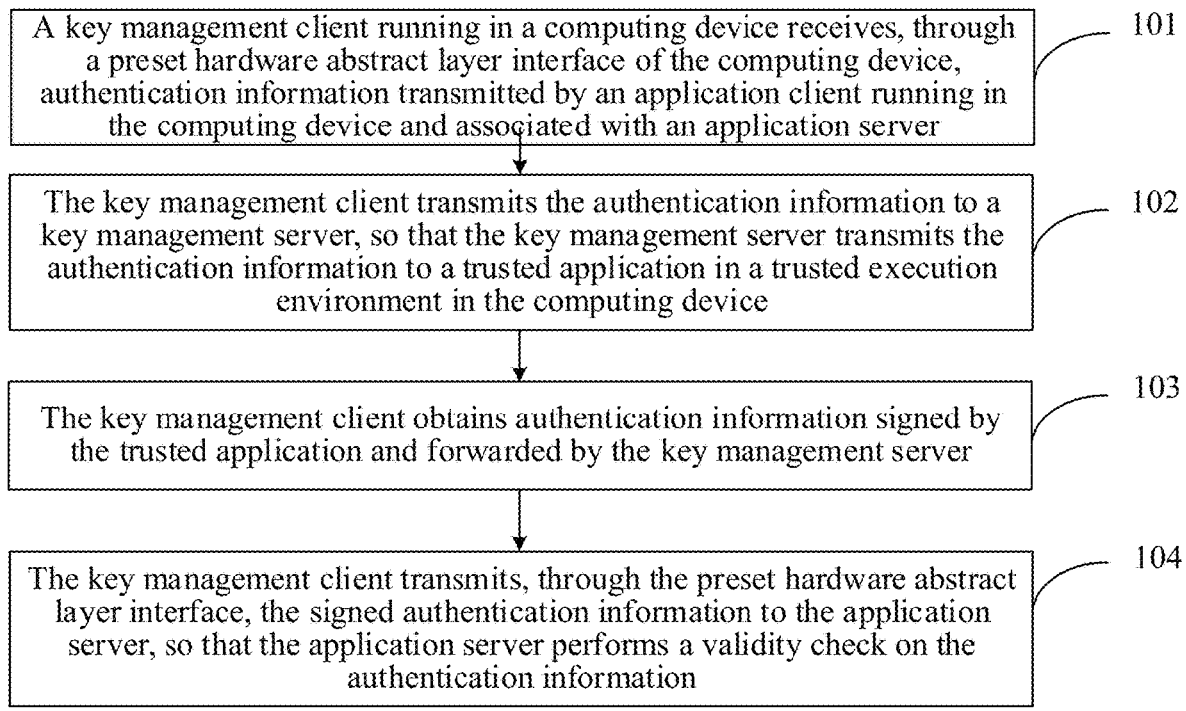
FIG. 1 is a schematic flowchart of an authentication information transmission method according to an exemplary embodiment of this disclosure.

Explicit embodiments of this disclosure are shown by using the foregoing accompanying drawings, more detailed descriptions are provided below. The accompanying drawings and literal descriptions are not intended to limit the scope of the idea of this disclosure in any manner, but explain the concept of this disclosure for a person skilled in the art with reference to specific embodiments.

DESCRIPTION OF EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent same or similar elements. The following implementations described in the following exemplary embodiments do not represent all implementations that are consistent with this disclosure. On the contrary, the implementations are merely examples of apparatuses and methods that are described in detail in the appended claims and that are consistent with some aspects of this disclosure.

At disclosure, to improve the security of biometric authentication information, the biometric authentication information obtained by a third-party application may be signed by a trusted application (TA) in a trusted execution environment (TEE) of a terminal device, and then authentication information verification may be performed by using an application server corresponding to the third-party application. During a data interaction between the third-party application and the trusted application, an application framework layer interface in a terminal system usually needs to be used. This requires the third-party application to define a function of the application framework layer interface, so that a defined new interface may execute a corresponding algorithm, to invoke a hardware abstract layer (HAL), thereby visiting the TA in the TEE.

Because the terminal system updates rapidly, in the foregoing information authentication method, interfaces need to be defined frequently with the frequent update of an application framework layer in the system. In addition, because open interfaces in the application framework layer are fragmented and coupled with each other, a path establishment process which uses the foregoing method to perform information authentication is complex and has high costs.

In the authentication information transmission method provided according to the embodiments of this disclosure, a key management client and a key management server may be defined in a hardware abstract layer in advance, so that during information authentication, an application client can transmit authentication information to the key management client through a preset hardware abstract layer interface. Then, the key management client may transmit, through the key management server, the authentication information to a trusted application in a trusted execution environment after receiving the authentication information. After the trusted application signs the authentication information and transmits signed authentication information to the key management server, the key management server may forward the signed authentication information to the key management client. The key management client may then transmit the signed authentication information, through the preset hardware abstract layer interface to an application server corresponding to the application client, so that the application server performs a validity check on the authentication information. In this way, the problem that the path establishment process of the information authentication is complex and has high costs due to the frequent update of the system may be avoided, the transmission time of the authentication information may be reduced, and the credibility of the authentication information may further be improved.

The authentication information transmission method, the key management client, a computer device, an authentication information transmission system, and a computer-readable non-transitory storage medium provided according to this disclosure are described below in detail with reference to the accompanying drawings.

First, the authentication information transmission method provided according to the embodiments of this disclosure is described below in detail with reference to FIG. 1.

FIG. 1 is a schematic flowchart of an authentication information transmission method according to an exemplary embodiment of this disclosure.

As shown in FIG. 1, the authentication information transmission method may include the following steps:

Step 101. A key management client receives, through a preset hardware abstract layer interface, authentication information transmitted by an application client.

Optionally, the authentication information transmission method provided according to this embodiment of this disclosure may be performed by the key management client provided according to this embodiment of this disclosure. The key management client may be configured in any computer device. Specifically, the computer device in this embodiment may be any hardware device having a data processing function, such as a mobile phone, a personal digital assistant, a tablet computer, or a desktop computer.

The authentication information may be any information that can be used for user authentication, such as a fingerprint, a password, a digital certificate, or the like.

The application client may be a third-party application in a terminal device. The third-party application may be an application different from a system application on the terminal device. For example, the third-party application may be an instant messaging application, a social networking application, a payment or banking application, or the like.

It may be understood that, when a user needs to use the third-party application to make a payment (for example, opening a payment page of the third-party application), or open a private application or file in the terminal device, the authentication information, such as the fingerprint or the password, may be inputted into the terminal device. In this embodiment of this disclosure, by defining a hardware abstract layer interface in advance, the application client can transmit, through the preset hardware abstract layer interface, the authentication information to the key management client after obtaining the authentication information. A hardware abstract layer is an interface layer between an operating system kernel and a hardware circuit, and is used for abstracting hardware. In some implementations of this disclosure, the hardware abstract layer may be capable of interacting with the system kernel and the hardware circuit directly (e.g., there are no other layers in between).

To enable the application client to transmit the authentication information to the key management client through the preset hardware abstract layer interface, it is necessary to open the hardware abstract layer interface to the application client. Then, in this embodiment of this disclosure, before step 101, the method may further include:

transmitting, by the key management client, an identifier of the preset hardware abstract layer interface to the application client.

The identifier of the hardware abstract layer interface may be arbitrarily set as required.

Specifically, after the key management client transmits the identifier of the preset hardware abstract layer interface to the application client, the application client may send the authentication information to the key management client via the preset hardware abstract layer interface. In the meanwhile, the key management client may identify the preset hardware abstract layer interface according to the identifier of the preset hardware abstract layer interface, and receive, through the preset hardware abstract layer interface, the authentication information transmitted by the application client.

Step 102. The key management client transmits the authentication information to a key management server, so that the key management server transmits the authentication information to a trusted application in a trusted execution environment.

Step 103. The key management client obtains authentication information signed by the trusted application and forwarded by the key management server.

The terminal device may be provided with a security zone, namely, the trusted execution environment in this embodiment of this disclosure. The zone is a trusted and secure environment, data stored and processed in which may be ensured to be independent of an external environment. Special applications in the terminal device, which require high confidentiality, security or credibility may run in the environment.

In this embodiment of this disclosure, the trusted application (TA) is an application run in a trusted execution environment (TEE). The trusted application may sign the authentication information, so that the authentication information may not be tampered with by other applications, thus ensuring the security and credibility of the authentication information in a transmission process.

Specifically, after receiving the authentication information transmitted by the application client, the key management client may transmit the authentication information to the key management server, so that the key management server transmits the authentication information to the trusted application in the trusted execution environment. After signing the received authentication information, the trusted application transmits the signed authentication information to the key management server which may further forward the signed authentication information to the key management client.

In this embodiment of this disclosure, to implement communication between the key management client and the key management server, a link path may be further necessary between the key management client and the key management server, that is, before step 102, the method may further include:

establishing, by the key management client and the key management server, a link path in a hardware abstract layer.

Specifically, the link path of the key management client and the key management server in the hardware abstract layer may be established in advance. The link path may exist persistently once established, so that the communication between the key management client and the key management server may be implemented through the link path.

Step 104. The key management client transmits, through the preset hardware abstract layer interface, the signed authentication information to an application server corresponding to the application client, so that the application server performs a validity check on the authentication information.

Specifically, after receiving the authentication information signed by the trusted application and forwarded by the key management server, the key management client can transmit, through the preset hardware abstract layer interface, the signed authentication information to the application server corresponding to the application client, so that the application server may performs the validity check on the authentication information.

It may be understood that, in this embodiment of this disclosure, the application client and the application server corresponding to the application client may communicate with the key management client through the hardware abstract layer interface defined in advance, the key management client can communicate with the key management server through the link path established in the hardware abstract layer, and the key management server can communicate with the trusted application (TA) in the trusted execution environment (TEE). In this case, after receiving the authentication information transmitted by the application client, the key management client can transmit the authentication information to the TA through the key management server, so that the authentication information transmitted by the application client may be signed by the TA. After signing the authentication information, the TA may transmit, through the key management server and the key management client, the signed authentication information to the application server corresponding to the application client, so that the application server performs the validity check on the authentication information signed by the TA, thus implementing the authentication of the authentication information.

Because a system update process may not involve and impact the hardware abstract layer and may be transparent to the hardware abstract layer, a communication path may be provided for third-party application authentication information transmission by directly defining or registering the key management client and the key management server in the hardware abstract layer, which avoids the problem that the path establishment process of the information authentication is complex, repetitive (e.g., after each system update), and has high costs due to the frequent system update. In addition, because the authentication information is transmitted by the application client to the key management client through the hardware abstract layer interface directly, without the overhead of being forwarded through an interface in an application framework layer (i.e., bypassing the application framework layer), the transmission time of the authentication information is reduced, the authentication information is less likely to be tampered with, and the credibility of the authentication information is improved.

In the authentication information transmission method according to this embodiment of this disclosure, after receiving, through the preset hardware abstract layer interface, the authentication information transmitted by the application client, the key management client first transmits the authentication information to the key management server, so that the key management server transmits the authentication information to the trusted application running in the trusted execution environment. Then, the key management client obtains the authentication information signed by the trusted application and forwarded by the key management server. Finally, the key management client transmits, through the preset hardware abstract layer interface, the signed authentication information to the application server corresponding to the application client, so that the application server performs the validity check on the authentication information. Therefore, a communication path is provided for authentication information transmission of a third-party application by directly defining or registering the key management client and the key management server on the hardware abstract layer, which avoids the problem that the path establishment process of the information authentication is complex, repetitive, and has high costs due to the frequent update of the system. In addition, because the authentication information is directly transmitted by the application client to the key management client through the hardware abstract layer interface, without being forwarded through an interface in an application framework layer, the transmission time of the authentication information is reduced, the authentication information is less likely to be tampered with, and the credibility of the authentication information is improved.

It can be learned from the foregoing analysis that the key management client receives, through the preset hardware abstract layer interface, the authentication information transmitted by the application client, and transmits the authentication information to the key management server. The key management server may transmit the authentication information to the trusted application running in the trusted execution environment for signature, and forward, after the trusted application signs the authentication information, the signed authentication information to the key management client. Then, the key management client may transmit, through the preset hardware abstract layer interface, the signed authentication information to the application server corresponding to the application client, so that the application server performs the validity check on the authentication information. In a possible implementation, after obtaining the authentication information signed by the trusted application, the application server further needs to verify the signature of the signed authentication information, to obtain the authentication information, so as to perform the validity check on the authentication information. For the foregoing situations, the following further describes the authentication information transmission method in this disclosure with reference to FIG. 2.

Figure 2:
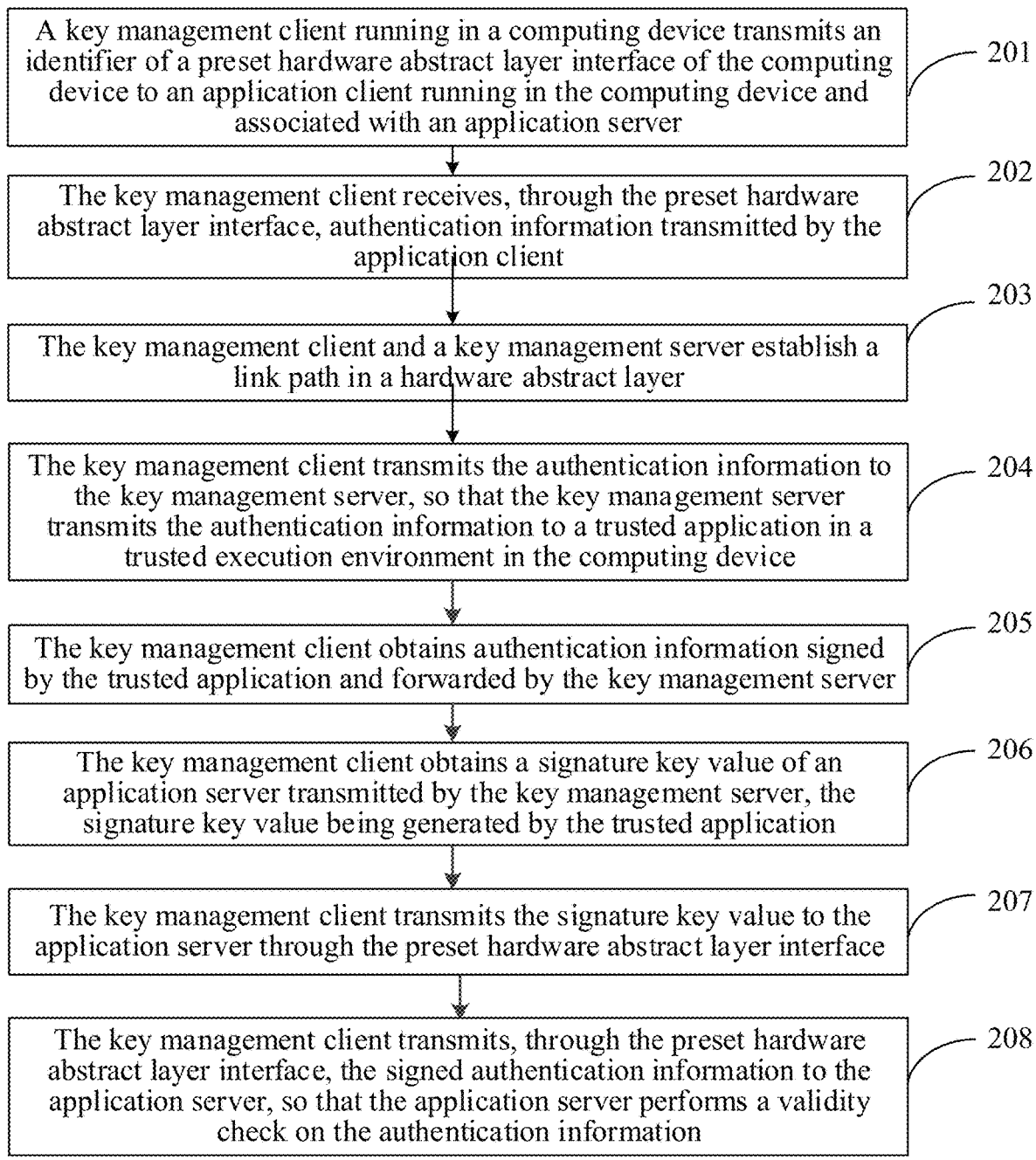
FIG. 2 is a schematic flowchart of an authentication information transmission method according to another exemplary embodiment of this disclosure.

FIG. 2 is a schematic flowchart of an authentication information transmission method according to another exemplary embodiment of this disclosure.

As shown in FIG. 2, the authentication information transmission method may include the following steps:

Step 201. A key management client transmits an identifier of a preset hardware abstract layer interface to an application client.

Step 202. The key management client receives, through the preset hardware abstract layer interface, authentication information transmitted by the application client.

Step 203. The key management client and a key management server establish a link path in a hardware abstract layer.

Step 203 may be performed after step 202 or may be performed before step 202, or may be performed simultaneously with step 202, as long as step 203 is performed before step 204, which is not limited in this disclosure.

Step 204. The key management client transmits the authentication information to the key management server through the link path on the hardware abstract layer, so that the key management server transmits the authentication information to a trusted application in a trusted execution environment.

Step 205. The key management client obtains authentication information signed by the trusted application and forwarded by the key management server.

For the specific implementation process and principle according to the foregoing steps 201 to 205, reference may be made to the related description of the foregoing embodiments, and details are not described herein.

Step 206. The key management client obtains a signature key value of the application server transmitted by the key management server, the signature key value being generated by the trusted application.

The key management client may obtain the signature key value of the application server while obtaining the authentication information signed by the trusted application and forwarded by the key management server.

Step 207. The key management client transmits the signature key value to the application server through the preset hardware abstract layer interface.

Step 208. The key management client transmits, through the preset hardware abstract layer interface, the signed authentication information to the application server corresponding to the application client, so that the application server performs a validity check on the authentication information.

It is to be understood that, it is the authentication information signed by the trusted application that the application server obtains through the preset hardware abstract layer interface. To perform the validity check on the authentication information, the application server further needs to perform signature verification on the signed authentication information first, to obtain the authentication information. As such, in this embodiment of this disclosure, the trusted application may first generate the signature key value of the application server, and transmit the signature key value of the application server to the key management server. The key management client may obtain the signature key value of the application server from the key management server, and transmit the signature key value to the application server through the preset hardware abstract layer interface, so that the application server performs the signature verification on the obtained signed authentication information according to the obtained signature key value, to obtain the authentication information.

Specifically, if the signature key value generated by the trusted application and obtained by the application server matches a signature corresponding to the obtained signed authentication information, the signature verification of the obtained signed authentication information may be completed, to obtain the authentication information, so that the application server may perform the validity check on the authentication information.

Steps 206 to 207 may be performed after step 205 or may be performed before step 205, or may be performed simultaneously with step 205, as long as steps 206 to 207 are performed before the application server performs the validity check on the authentication information, which is not limited in this disclosure.

The signature key value of the application server generated by the trusted application is transmitted by the key management client to the application server through the preset hardware abstract layer interface, so that after obtaining the authentication information signed by the trusted application and transmitted by the key management client, the application server may obtain the authentication information according to the obtained signature key value, so as to perform the validity check on the authentication information.

In the authentication information transmission method according to this embodiment of this disclosure, after transmitting the identifier of the preset hardware abstract layer interface to the application client and receiving, through the preset hardware abstract layer interface, the authentication information transmitted by the application client, the key management client may first transmit the authentication information to the key management server through the link path established in the hardware abstract layer in advance, so that the key management server transmits the authentication information to the trusted application in the trusted execution environment. Then, the key management client obtains the authentication information signed by the trusted application and forwarded by the key management server. After transmitting, to the application server through the preset hardware abstract layer interface, the signature key value of the application server obtained from the key management server, the key management client transmits, through the preset hardware abstract layer interface, the signed authentication information to the application server corresponding to the application client, so that the application server performs the validity check on the authentication information. In this way, the problem that the path establishment process of the information authentication is complex, repetitive, and has high costs due to the frequent update of the system is avoided, the transmission time of the authentication information is reduced, and the credibility of the authentication information is improved.

It can be learned from the foregoing analysis that after the key management client receives, through the preset hardware abstract layer interface, the authentication information transmitted by the application client, and transmits the authentication information to the key management server. The key management server may transmit the authentication information to the trusted application in the trusted execution environment for signature, and forward, after the trusted application signs the authentication information, the signed authentication information to the key management client. Then, the key management client can transmit, through the preset hardware abstract layer interface, the signed authentication information to the application server corresponding to the application client, so that the application server performs the validity check on the authentication information. In one implementation, there may be a plurality of application clients that require information authentication. Therefore, the key management client may obtain authentication information transmitted by the plurality of application clients. For the foregoing situations, the following further describes the authentication information transmission method in this disclosure with reference to FIG. 3.

Figure 3:
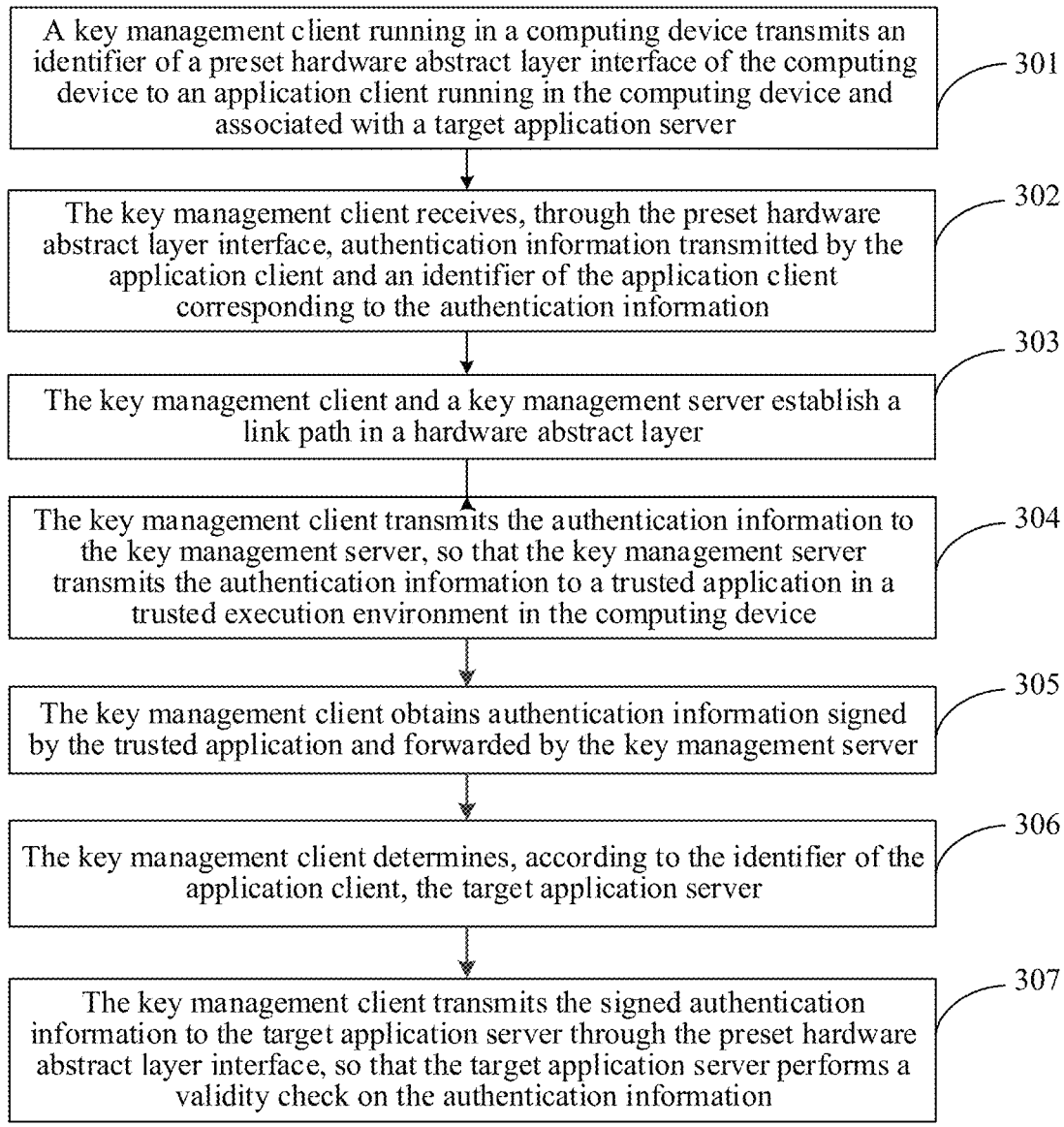
FIG. 3 is a schematic flowchart of an authentication information transmission method according to still another exemplary embodiment of this disclosure.

FIG. 3 is a schematic flowchart of an authentication information transmission method according to still another exemplary embodiment of this disclosure.

As shown in FIG. 3, the authentication information transmission method may include the following steps:

Step 301. A key management client transmits an identifier of a preset hardware abstract layer interface to an application client.

Step 302. The key management client receives, through the preset hardware abstract layer interface, authentication information transmitted by the application client and an identifier of the application client corresponding to the authentication information.

Step 303. The key management client and a key management server establish a link path in a hardware abstract layer.

Step 304. The key management client transmits the authentication information to the key management server, so that the key management server transmits the authentication information to a trusted application in a trusted execution environment.

Step 305. The key management client obtains authentication information signed by the trusted application and forwarded by the key management server.

For the specific implementation process and principle of the foregoing steps 301 to 305, reference may be made to the related description of the foregoing embodiments, and details are not described herein.

Step 306. The key management client determines, according to the identifier of the application client, a target application server corresponding to the application client.

Step 306 may be performed after step 305 or may be performed before step 305, or may be performed simultaneously with step 305, as long as step 306 is performed before step 307, which is not limited in this disclosure.

Step 307. The key management client transmits the signed authentication information to the target application server through the preset hardware abstract layer interface, so that the target application server performs a validity check on the authentication information.

Specifically, while transmitting the authentication information to the key management client through the preset hardware abstract layer interface, the application client may simultaneously transmit the identifier of the application client corresponding to the authentication information to the key management client, so that the key management client can simultaneously transmit the identifier of the application client corresponding to the authentication information together with the authentication information to the trusted application through the key management server. After signing the authentication information, the trusted application may simultaneously transmit the signed authentication information and the identifier of the application client corresponding to the authentication information to the key management server. Then, after obtaining the authentication information signed by the trusted application and forwarded by the key management server and the identifier of the application client corresponding to the authentication information, the key management client can determine, according to the identifier of the application client, the target application server corresponding to the application client, and transmit the signed authentication information to the target application server through the preset hardware abstract layer interface, so that the target application server performs the validity check on the authentication information.

For example, it is assumed that after the key management client transmits the identifier of the preset hardware abstract layer interface to an application client A and an application client B, the application client A transmits authentication information a to the key management client through the preset hardware abstract layer interface, and simultaneously transmits an identifier "A" of the application client A; the application client B transmits authentication information b to the key management client through the preset hardware abstract layer interface, and simultaneously transmits an identifier "B" of the application client B.

Then, after receiving the authentication information a and the corresponding identifier "A", the authentication information b and the corresponding identifier "B", the key management client may transmit the authentication information a and the corresponding identifier "A", the authentication information b and the corresponding identifier "B" to the key management server, so that the key management server transmits the authentication information a and the corresponding identifier "A", the authentication information b and the corresponding identifier "B" to the trusted application in the trusted execution environment. Then, the trusted application may separately sign the authentication information a and the authentication information b.

After separately signing the authentication information a and the authentication information b, the trusted application may transmit authentication information a' obtained by signing the authentication information a and the corresponding identifier "A", the authentication information b' obtained by signing the authentication information b and the corresponding identifier "B" to the key management server. Then, the key management client may obtain the authentication information a' and the corresponding identifier "A", the authentication information b' and the corresponding identifier "B" that are forwarded by the key management server, and determine, according to the identifiers "A" and "B", target application servers corresponding to the application client A and the application client B, respectively, to transmit the signed authentication information a' to the target application server corresponding to the application client A, and transmit the signed authentication information b' to the target application server corresponding to the application client B, so that the target application server corresponding to the application client A performs the validity check on the authentication information a, and the target application server corresponding to the application client B performs the validity check on the authentication information b.

In the authentication information transmission method according to this embodiment of this disclosure, after transmitting the identifier of the preset hardware abstract layer interface to the application client and receiving, through the preset hardware abstract layer interface, the authentication information transmitted by the application client, the key management client may first transmit the authentication information to the key management server through the link path established in the hardware abstract layer in advance, so that the key management server transmits the authentication information to the trusted application in the trusted execution environment. Then, the key management client obtains the authentication information signed by the trusted application and forwarded by the key management server, and after determining, according to the identifier of the application client, the target application server corresponding to the application client, the key management client transmits the signed authentication information to the target application server through the preset hardware abstract layer interface, so that the target application server performs the validity check on the authentication information. In this way, the problem that the path establishment process of the information authentication is complex, repetitive, and has high costs due to the frequent update of the system is avoided, the transmission time of the authentication information is reduced, and the credibility of the authentication information is improved. In addition, the key management client determines, according to the identifier of the application client, the target application server corresponding to the application client, and then transmits the signed authentication information to the target application server, so that the target application server performs the validity check on the authentication information. Therefore, information authentication may be simultaneously performed on authentication information transmitted by a plurality of target clients each associated with a corresponding target application server, thereby improving the efficiency of the information authentication.

The authentication information transmission method according to the embodiments of this disclosure is further described below with reference to a signaling interaction diagram of the authentication information transmission method shown in FIG. 4.

Figure 4:
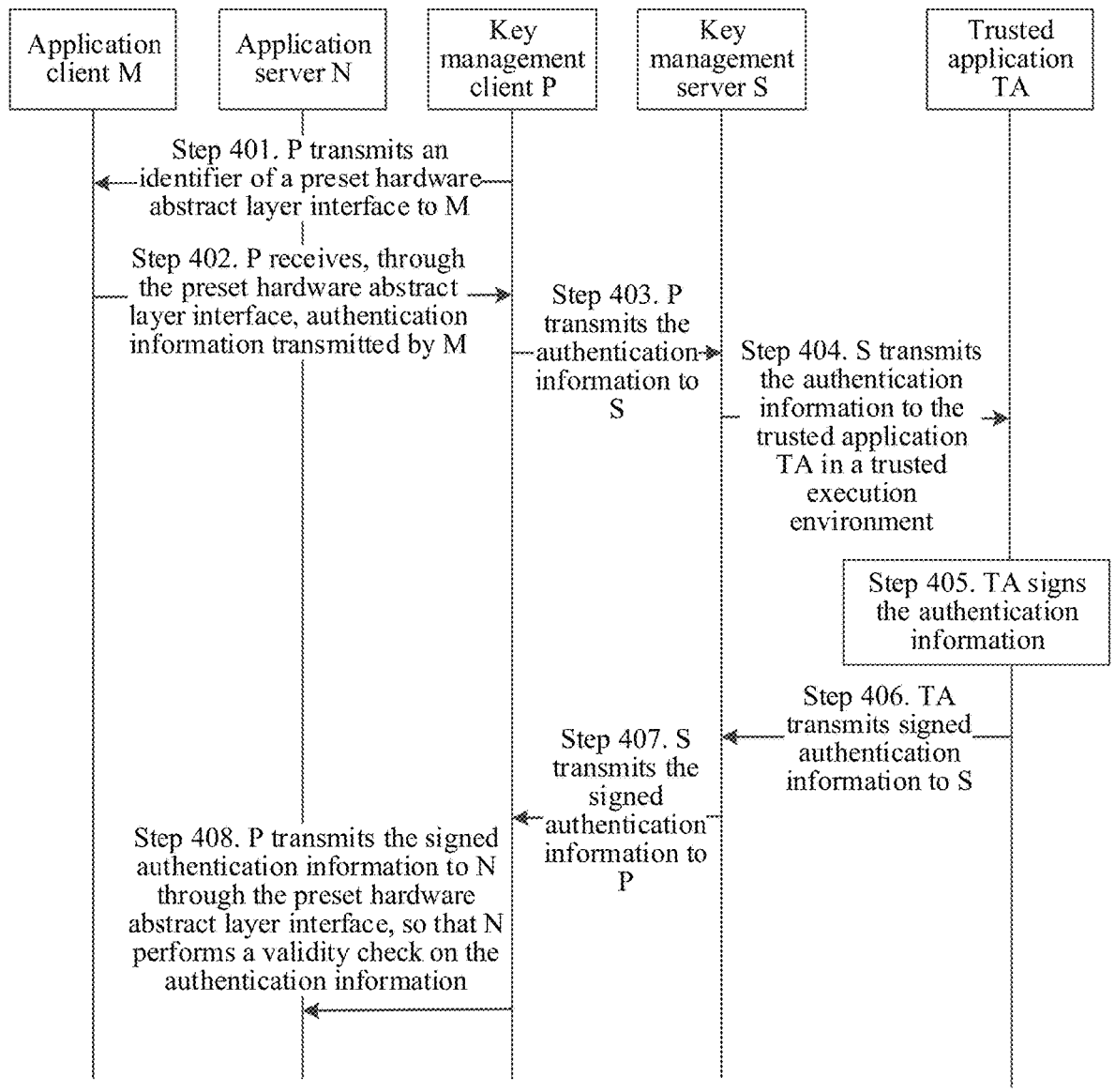
FIG. 4 is a signaling interaction diagram of an authentication information transmission method according to an exemplary embodiment of this disclosure.

FIG. 4 is a signaling interaction diagram of an authentication information transmission method according to an exemplary embodiment of this disclosure.

As shown in FIG. 4, the authentication information transmission method is performed by an application client M, an application server N corresponding to the application client M, a key management client P, a key management server S, and a trusted application TA in a trusted execution environment.

Step 401. P transmits an identifier of a preset hardware abstract layer interface to M.

Step 402. P receives, through the preset hardware abstract layer interface, authentication information transmitted by M.

Step 403. P transmits the authentication information to S.

Step 404. S transmits the authentication information to the trusted application TA in the trusted execution environment.

Step 405. TA performs signature on the authentication information.

Step 406. TA transmits signed authentication information to S.

Step 407. S forwards the signed authentication information to P.

Step 408. P transmits the signed authentication information to N through the preset hardware abstract layer interface, so that N performs a validity check on the authentication information.

Through the foregoing process, the authentication information transmitted by the application client M can be transmitted to the trusted application TA in the trusted execution environment for signature, and after the TA signs the authentication information, the signed authentication information is transmitted to the application server N corresponding to the application client M, so that the application server N performs the validity check on the authentication information. In this way, the problem that the path establishment process of the information authentication is complex and has high costs due to the frequent update of the system is avoided, the transmission time of the authentication information is reduced, and the credibility of the authentication information is improved.

The authentication information transmission method according to the foregoing embodiments of this disclosure may be applied to scenarios such as fingerprint payment, and official account/applet fingerprint authentication interface. The authentication information transmission method according to the embodiments of this disclosure is described below by using a scenario of fingerprint payment as an example.

Figure 5:
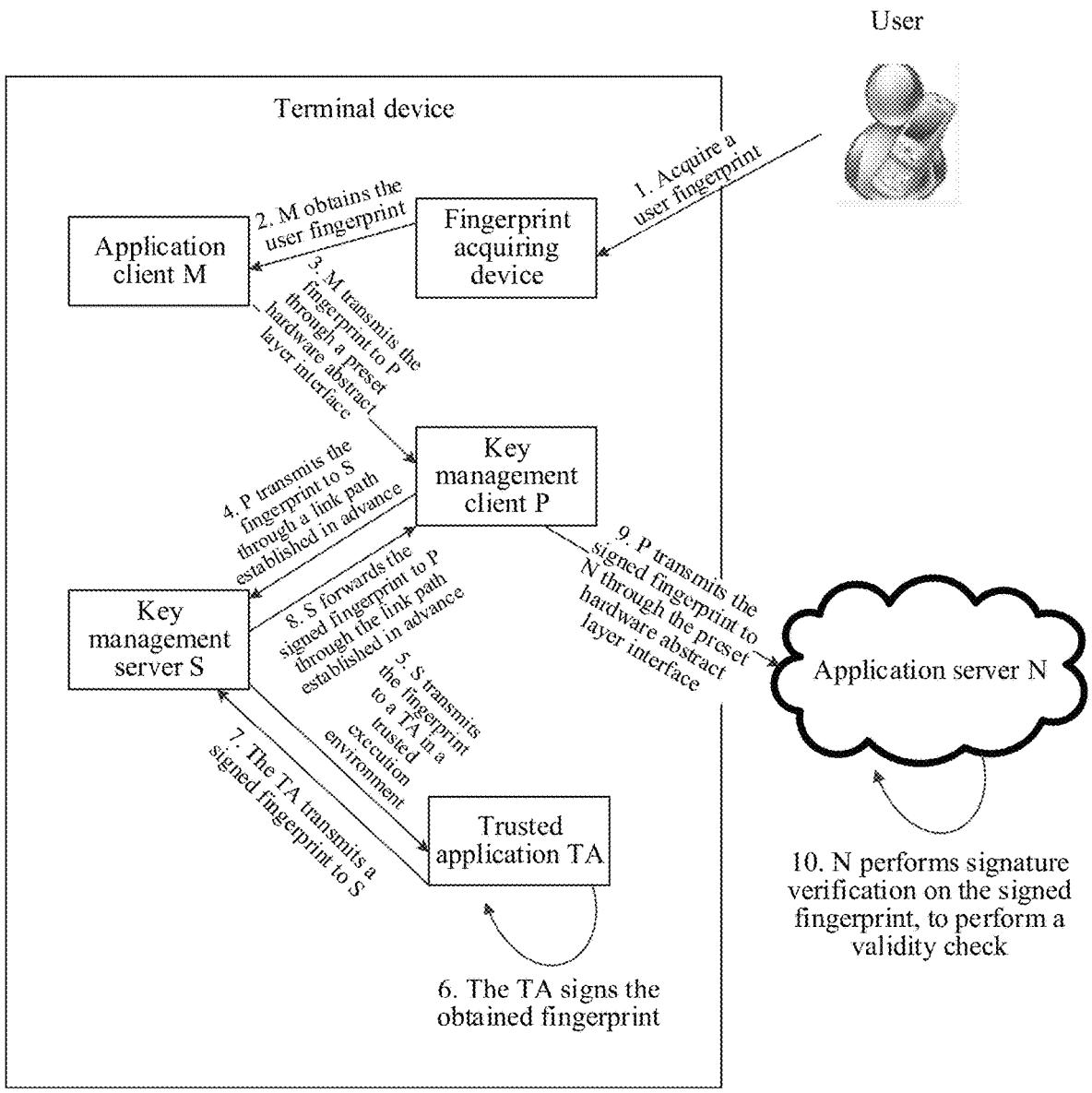
FIG. 5 is a diagram of an application scenario of an authentication information transmission method according to an exemplary embodiment of this disclosure.

FIG. 5 is a diagram of an application scenario of an authentication information transmission method according to an exemplary embodiment of this disclosure.

As shown in FIG. 5, assuming that an application client M is to use a fingerprint payment function to make a payment and the application client M corresponds to an application server N, after a user enters a fingerprint into a terminal device through a fingerprint acquiring device in the terminal device (step 1), the application client M may transmit the obtained fingerprint to a key management client P through a hardware abstract layer defined in advance (steps 2 to 3), then the key management client P transmits the fingerprint to a key management server S through a link path established in advance (step 4), and the key management server S transmits the fingerprint to a trusted application TA in a trusted execution environment (step 5).

After the trusted application TA signs the obtained fingerprint (step 6), a signed fingerprint may be transmitted to the key management server S (step 7), then the key management server S forwards the signed fingerprint to the key management client P through the link path established in advance (step 8), and the key management client P transmits the signed fingerprint to the application server N through a preset hardware abstract layer interface (step 9). After obtaining the signed fingerprint, the application server N may perform signature verification on the signed fingerprint, and then perform a validity check on the fingerprint obtained through the signature verification (step 10). Payment may go through after the application server N determines that the fingerprint is valid.

Figure 6A:
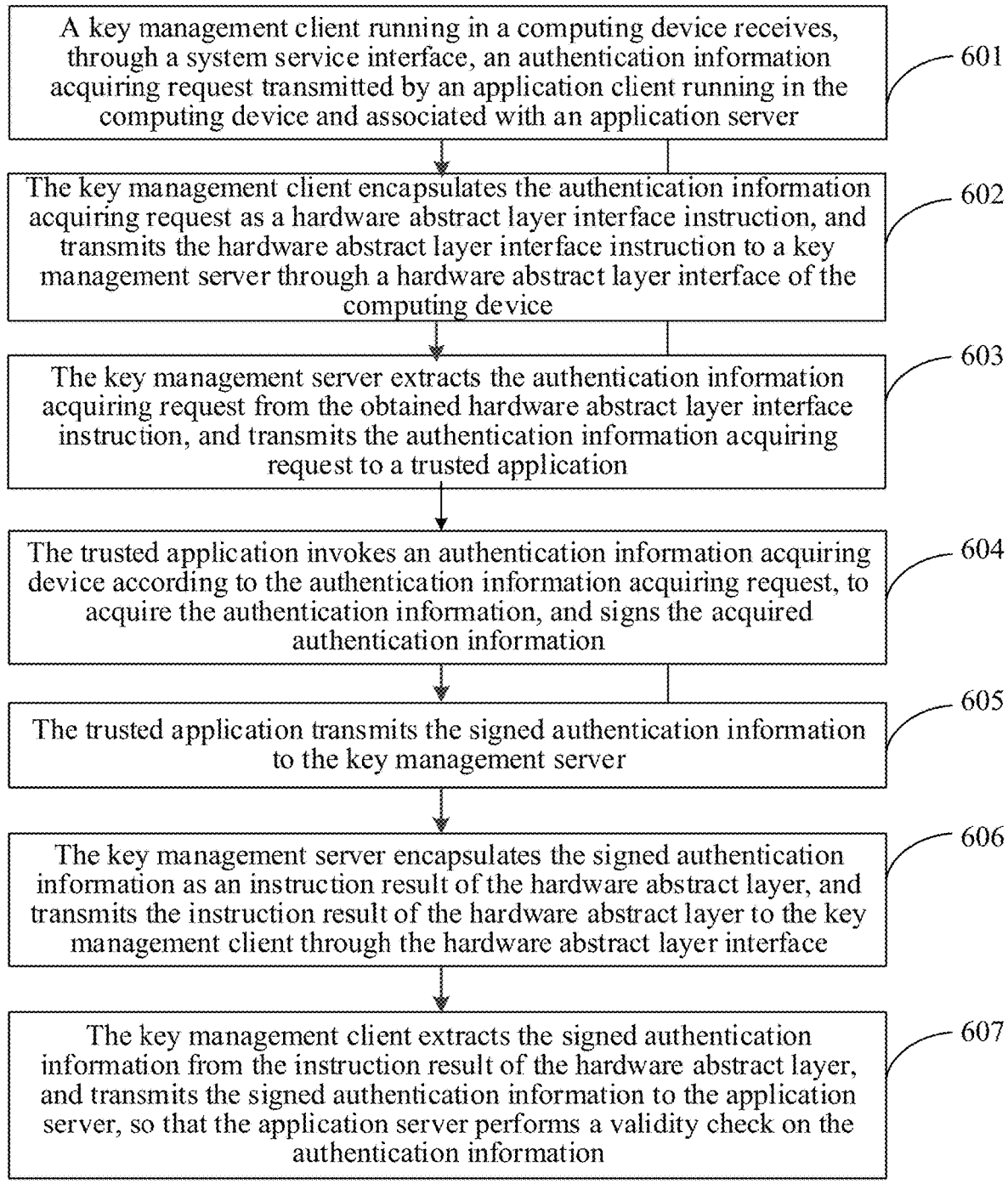
FIG. 6A is a schematic flowchart of an authentication information transmission method according to an exemplary embodiment of this disclosure.

FIG. 6A is a schematic flowchart of an authentication information transmission method according to an exemplary embodiment of this disclosure.

As shown in FIG. 6A, the authentication information transmission method may include the following steps:

Step 601. A key management client receives, through a system service interface, an authentication information acquiring request transmitted by an application client.

According to this embodiment of this disclosure, the key management client may be a system service provided in an operating system of a terminal device. The key management client includes the system service interface. The application client may invoke the system service interface of the key management client, and initiate the authentication information acquiring request to the key management client.

A system service link path may be established between the key management client and the application client through the system service interface in advance. The system service interface may be an interface defined by using a system interface definition language, and is used for communication between the application client and the key management client by means such as Inter-process Communication (IPC). For example, the system interface definition language may be Android interface definition language (AIDL), and the system service interface may be an AIDL interface.

For example, the authentication information acquiring request may be a fingerprint acquiring request. The authentication information acquiring request may include an identifier of the application client.

Step 602. The key management client encapsulates the authentication information acquiring request as a hardware abstract layer interface instruction, and transmits the hardware abstract layer interface instruction to a key management server through a hardware abstract layer interface.

According to this embodiment of this disclosure, the key management server may include the hardware abstract layer interface, the key management client may invoke the hardware abstract layer interface of the key management server, to transmit the hardware abstract layer interface instruction to the key management server. For example, the key management server is provided in a trusted execution environment of the terminal device.

A link path of a hardware abstract layer is established between the key management client and the key management server through the hardware abstract layer interface in advance. For example, the hardware abstract layer interface may be an interface defined by using a hardware abstract layer interface definition language (HIDL).

Step 603. The key management server extracts the authentication information acquiring request from the obtained hardware abstract layer interface instruction, and transmits the authentication information acquiring request to a trusted application.

According to one embodiment of this disclosure, the key management server may transmit the authentication information acquiring request to the trusted application by means of Pass-through.

Step 604. The trusted application invokes an authentication information acquiring device according to the authentication information acquiring request, to acquire the authentication information, and signs the acquired authentication information.

An example of the authentication information acquiring device is a fingerprint acquiring device in the terminal device. Signed authentication information may include the identifier of the application client. The signed authentication information may further include a signature key value.

Step 605. The trusted application transmits the signed authentication information to the key management server.

Step 606. The key management server encapsulates the signed authentication information as an instruction result of the hardware abstract layer, and transmits the instruction result of the hardware abstract layer to the key management client through the hardware abstract layer interface.

Step 607. The key management client extracts the signed authentication information from the instruction result of the hardware abstract layer, and transmits the signed authentication information to an application server corresponding to the application client, so that the application server performs a validity check on the authentication information.

Specifically, the key management client may determine, according to the identifier of the application client included in the signed authentication information, the application server corresponding to the application client, and then transmit the signed authentication information to the corresponding application server.

In the authentication information transmission method according to this embodiment of this disclosure, the problem that the path establishment process of the information authentication is complex, repetitive, and has high costs due to the frequent update of the system may be avoided, the transmission time of the authentication information is reduced, and the credibility of the authentication information is improved.

Figure 6B:
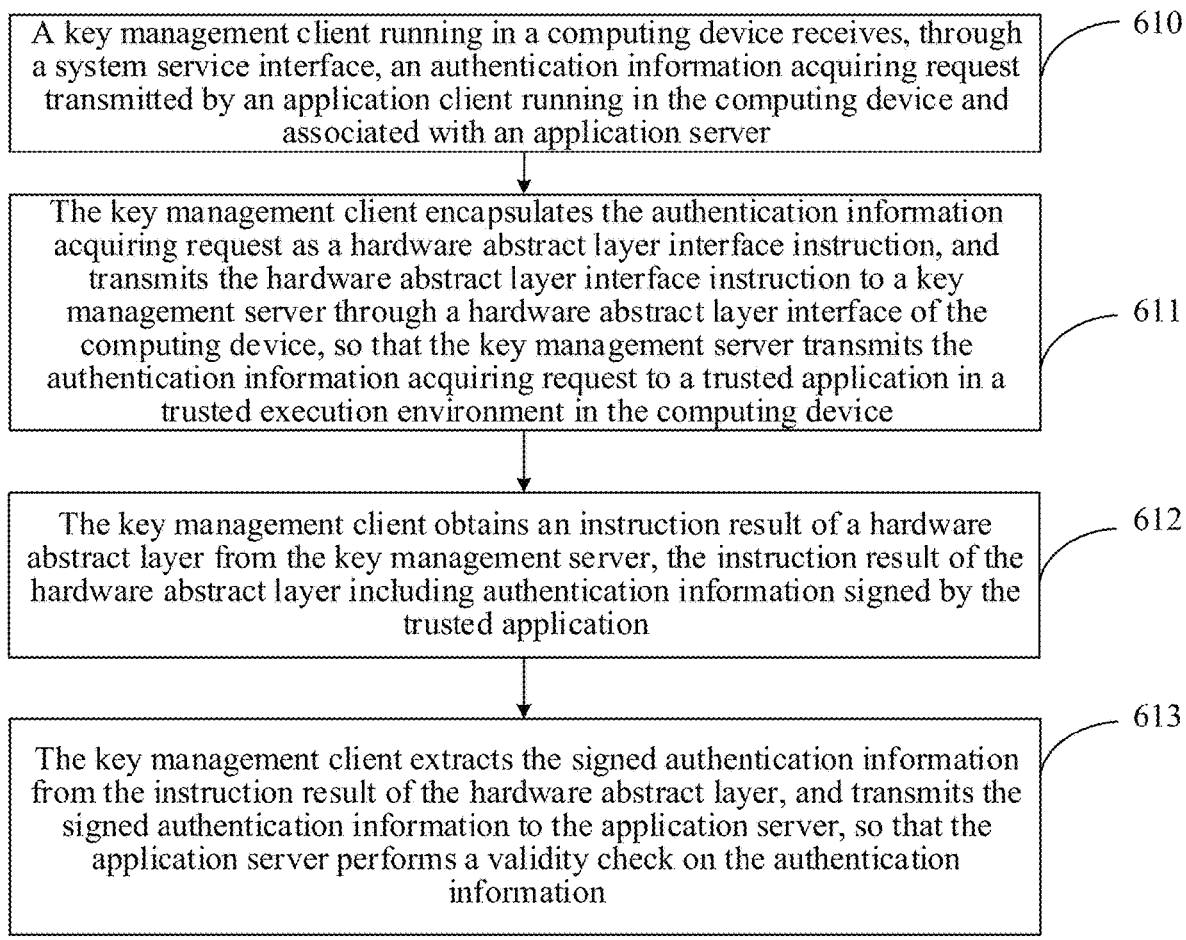
FIG. 6B is a schematic flowchart of an authentication information transmission method according to another exemplary embodiment of this disclosure.

FIG. 6B is a schematic flowchart of an authentication information transmission method applied to a key management client according to yet another exemplary embodiment of this disclosure. As shown in FIG. 6B, the method may include the following steps:

Step 610. A key management client receives, through a system service interface, an authentication information acquiring request transmitted by an application client.

Step 611. The key management client encapsulates the authentication information acquiring request as a hardware abstract layer interface instruction, and transmits the hardware abstract layer interface instruction to a key management server through a hardware abstract layer interface, so that the key management server transmits the authentication information acquiring request to a trusted application running in a trusted execution environment.

Step 612. The key management client obtains an instruction result of a hardware abstract layer from the key management server, the instruction result of the hardware abstract layer including authentication information signed by the trusted application.

Step 613. The key management client extracts the signed authentication information from the instruction result of the hardware abstract layer, and transmits the signed authentication information to an application server corresponding to the application client, so that the application server performs a validity check on the authentication information.

For the steps in FIG. 6B, refer to specific descriptions of the corresponding steps in FIG. 6A.

The authentication information transmission method in FIG. 6A and FIG. 6B, and the authentication information transmission method in other embodiments of this disclosure may be referenced to each other.

In an exemplary embodiment, a key management client is further provided.

Figure 7:
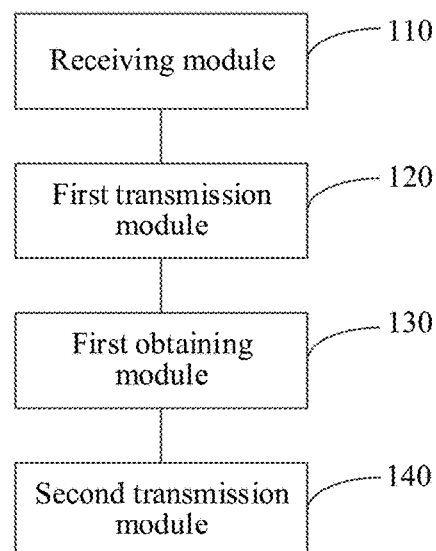
FIG. 7 is a schematic structural diagram of a key management client according to an exemplary embodiment of this disclosure.

FIG. 7 is a schematic structural diagram of a key management client according to an exemplary embodiment of this disclosure.

As shown in FIG. 7, the key management client of this disclosure includes: a receiving module 110, a first transmission module 120, a first obtaining module 130, and a second transmission module 140.

The receiving module 110 is configured to receive, through a preset hardware abstract layer interface, authentication information transmitted by an application client;

the first transmission module 120 is configured to transmit the authentication information to a key management server, so that the key management server transmits the authentication information to a trusted application in a trusted execution environment;

the first obtaining module 130 is configured to obtain authentication information signed by the trusted application and forwarded by the key management server; and the second transmission module 140 is configured to transmit, through the preset hardware abstract layer interface, the signed authentication information to an application server corresponding to the application client, so that the application server performs a validity check on the authentication information.

Specifically, the key management client provided according to this embodiment of this disclosure may perform the authentication information transmission method provided according to the embodiments of this disclosure. The key management client may be configured in any computer device having a data processing function.

In a possible implementation, the foregoing key management client further includes:
a second obtaining module, configured to obtain a signature key value of the application server transmitted by the key management server, the signature key value being generated by the trusted application; and
a third transmission module, configured to transmit the signature key value to the application server through the preset hardware abstract layer interface.

In another possible implementation, the foregoing key management client further includes:
a link path establishing module, configured to establish a link path between the key management client and the key management server in a hardware abstract layer.

In another possible implementation, the receiving module 110 is further configured to:
receive, through the preset hardware abstract layer interface, an identifier of the application client corresponding to the authentication information transmitted by the application client;
the foregoing key management client further includes:
a determining module, configured to determine, according to the identifier of the application client, a target application server corresponding to the application client; and
correspondingly, the foregoing second transmission module 140 is specifically configured to:
transmit the signed authentication information to the target application server through the preset hardware abstract layer interface.

In another possible implementation, the foregoing key management client further includes:
a fourth transmission module, configured to transmit an identifier of the preset hardware abstract layer interface to the application client.

The foregoing description of the embodiment of the authentication information transmission method is also applicable to the key management client of this embodiment, which is implemented in a similar principle, and details are not described herein again.

The key management client provided according to this embodiment of this disclosure, after receiving, through the preset hardware abstract layer interface, the authentication information transmitted by the application client, may first transmit the authentication information to the key management server, so that the key management server transmits the authentication information to the trusted application in the trusted execution environment. Then, the key management client obtains the authentication information signed by the trusted application and forwarded by the key management server. Finally, the key management client transmits, through the preset hardware abstract layer interface, the signed authentication information to the application server corresponding to the application client, so that the application server performs the validity check on the authentication information. In this way, the problem that the path establishment process of the information authentication is complex and has high costs due to the frequent update of the system is avoided, the transmission time of the authentication information is reduced, and the credibility of the authentication information is improved.

In an exemplary embodiment, a computer device is further provided.

Figure 8:
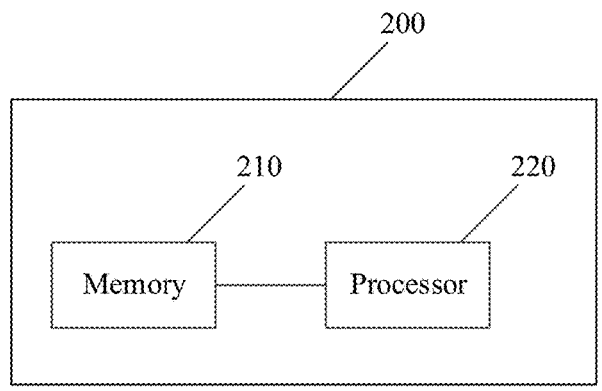
FIG. 8 is a schematic structural diagram of a computer device according to an exemplary embodiment of this disclosure.

FIG. 8 is a schematic structural diagram of a computer device according to an exemplary embodiment of this disclosure. The computer device shown in FIG. 8 is only an example, and does not impose any restriction on functions and scopes of use of the embodiments of this disclosure.

Referring to FIG. 8, a computer device 200 includes: a memory 210 and a processor 220, the memory 210 storing a computer program, the computer program, when executed by the processor 220, causing the processor 220 to perform the authentication information transmission method according to the foregoing embodiments.

Figure 9:
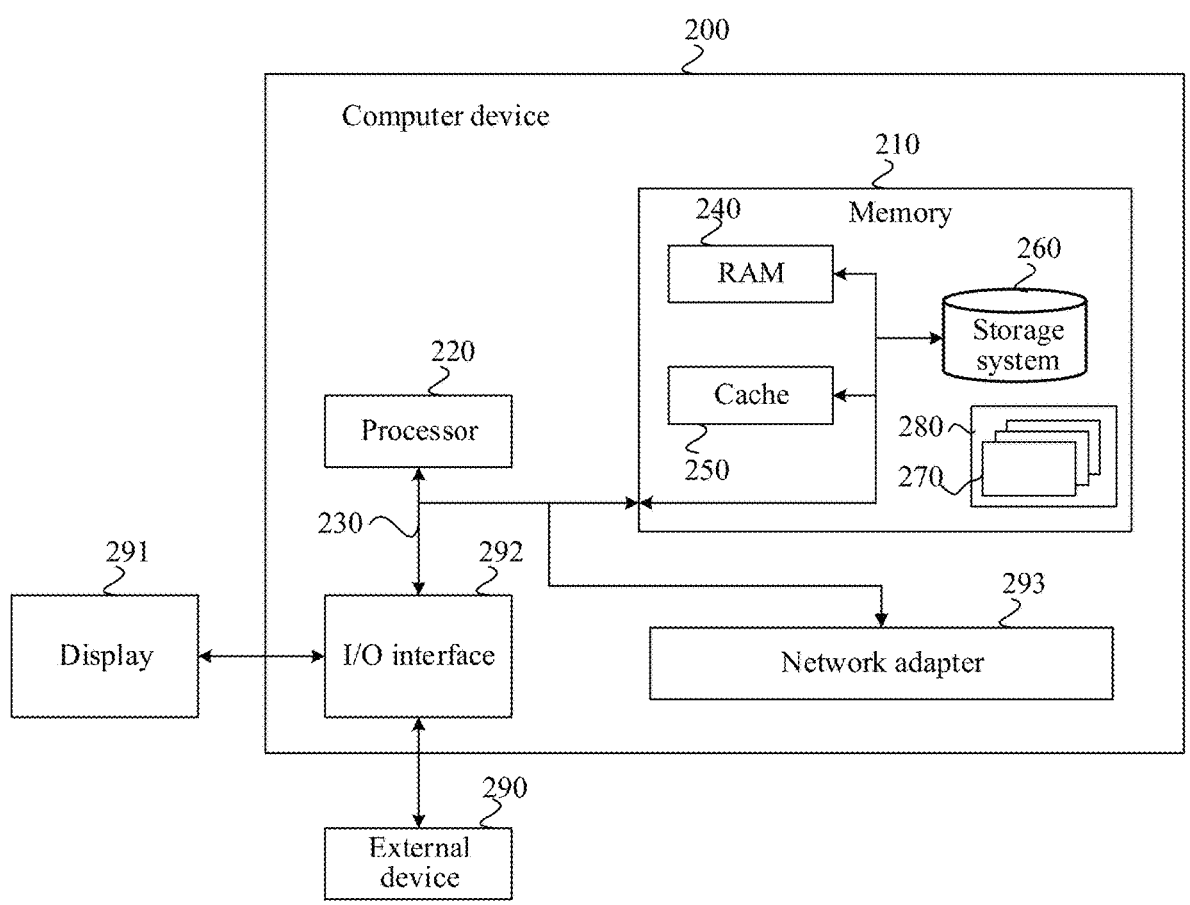
FIG. 9 is a schematic structural diagram of a computer device according to another exemplary embodiment of this disclosure.

In an optional implementation, as shown in FIG. 9, the computer device 200 may further include: the memory 210 and the processor 220, a bus 230 connecting different components (including the memory 210 and the processor 220), the memory 210 storing a computer program, the computer program, when executed by the processor 220, implementing the authentication information transmission method according to the embodiments of this disclosure.

The bus 230 represents one or more of several types of bus structures, including a memory bus or a memory controller, a peripheral bus, an accelerated graphics port, a processor, or a local bus using any bus structure among various bus structures. For example, the architectures include, but are not limited to an industrial standard architecture (ISA) bus, a micro channel architecture (MCA) bus, an enhanced ISA bus, a video electronics standards association (VESA) local bus, and a peripheral component interconnection (PCI) bus.

The computer device 200 typically includes a variety of computer device-readable storage media. The media may be any available media that can be accessed by the computer device 200, including volatile and non-volatile media, removable and non-removable media.

The memory 210 may further include a computer system-readable medium in the form of a volatile memory, such as a random access memory (RAM) 240 and/or a cache memory 250. The computer device 200 may further include other removable/non-removable, transitory/non-transitory computer system-readable media. Only as an example, a storage system 260 may be used for reading and writing a non-removable and non-transitory magnetic medium (not shown in FIG. 9, and usually referred to as a "hard-disk drive"). Although not shown in FIG. 9, a disk drive for reading and writing a removable non-transitory disk (such as a "floppy disk"), and an optical disk drive for reading and writing a removable non-transitory optical disk (such as a CD-ROM, DVD-ROM or other optical media) may be provided. In such cases, each drive may be connected to the bus 230 by using one or more data medium interfaces. The memory 210 may include at least one program product, the program product having a set of program modules (for example, at least one program module) configured to perform functions of the embodiments of this disclosure.

A program/utility 280 having a set of program modules (at least one program module) 270 may be stored in the memory 210. The program modules 270 include, but are not limited to an operating system, one or more application programs, other program modules and program data. Each or a certain combination of the examples may include an implementation of a network environment. The program module 270 usually performs functions and/or methods in the embodiments described in this disclosure.

The computer device 200 may also communicate with one or more external devices 290 (such as a keyboard, a pointing device and a display 291), and may also communicate with one or more devices that enable a user to interact with the computer device 200, and/or any device (such as a network card or a modem) that enables the computer device 200 to communicate with one or more other computing devices. The communication may be performed by using an input/output (I/O) interface 292. In addition, the computer device 200 may further communicate with one or more networks (for example, a local area network (LAN), a wide area network (WAN), and/or a public network, such as Internet) by using a network adapter 293. As shown in FIG. 9, the network adapter 293 communicates with other modules of the computer device 200 by using the bus 230. It is to be understood that, although not shown in FIG. 9, other hardware and/or software modules may be used in combination with the computer device 200, including, but not limited to: micro code, a device driver, a redundancy processing unit, an external disk drive array, a RAID system, a tape drive, a data backup storage system, and the like.

The foregoing description of the embodiment of the authentication information transmission method is also applicable to the computer device of this embodiment, which is implemented in a similar principle, and details are not described herein again.

The key management client in the computer device provided according to this embodiment of this disclosure, after receiving, through the preset hardware abstract layer interface, the authentication information transmitted by the application client, may first transmit the authentication information to the key management server, so that the key management server transmits the authentication information to the trusted application in the trusted execution environment. Then, the key management client obtains the authentication information signed by the trusted application and forwarded by the key management server. Finally, the key management client transmits, through the preset hardware abstract layer interface, the signed authentication information to the application server corresponding to the application client, so that the application server performs the validity check on the authentication information. In this way, the problem the path establishment process of the information authentication is complex and has high costs due to the frequent update of the system is avoided, the transmission time of the authentication information is reduced, and the credibility of the authentication information is improved.

In an exemplary embodiment, this disclosure further provides an authentication information transmission system, including an application client, an application server, a key management server, a trusted application, and a key management client according to the foregoing embodiments.

The authentication information transmission system provided according to this embodiment of this disclosure includes an application client, an application server, a key management server, a trusted application, and a key management client according to the foregoing embodiments. After receiving, through a preset hardware abstract layer interface, authentication information transmitted by the application client, the key management client may transmit the authentication information to the trusted application in a trusted execution environment through the key management server for signature, then receive signed authentication information through the key management server after the trusted application signs the authentication information, and transmit the signed authentication information to the application server corresponding to the application client, so that the application server performs a validity check on the authentication information. In this way, the problem that the path establishment process of the information authentication is complex and has high costs due to the frequent update of the system is avoided, the transmission time of the authentication information is reduced, and the credibility of the authentication information is improved.

In an exemplary embodiment, this disclosure further provides a computer-readable non-transitory storage medium.

The foregoing computer-readable non-transitory storage medium stores a computer program, the program, when executed by a processor, implementing the authentication information transmission method.

The foregoing description of the embodiment of the authentication information transmission method is also applicable to the computer-readable non-transitory storage medium of this embodiment, which is implemented in a similar principle, and details are not described herein again.

The computer-readable non-transitory storage medium provided according to this embodiment of this disclosure may be configured in any computer device that can perform information authentication. During information authentication, by performing the foregoing authentication information transmission method stored in the computer-readable non-transitory storage medium, the problem that the path establishment process of the information authentication is complex and has high costs due to the frequent update of the system can be avoided, the transmission time of the authentication information can be reduced, and the credibility of the authentication information can be improved.

In an exemplary embodiment, this disclosure further provides a computer program product. When instructions in the computer program product is executed by a processor, the authentication information transmission method according to the foregoing embodiments is implemented.

The computer program product provided according to this embodiment of this disclosure can be written into any computer device that can perform information authentication. During information authentication, by executing a program corresponding to the authentication information transmission method, the problem that the path establishment process of the information authentication is complex and has high costs due to the frequent update of the system can be avoided, the transmission time of the authentication information is reduced, and the credibility of the authentication information is improved.

In the descriptions of this disclosure, terms "first" and "second" are only used for description and cannot be understood as indicating or implying relative importance or implying a quantity of the indicated technical features. Therefore, a feature limited by "first" or "second" may explicitly or implicitly include one or more of the features. In the descriptions of this disclosure, "a plurality of" means two or more, unless otherwise definitely and specifically limited.

In the descriptions of this specification, description of a reference term such as "an embodiment", "some embodiments", "an example", "a specific example", or "some examples" means that a specific feature or characteristic that is described with reference to this embodiment or the example is included in at least one embodiment or example of this disclosure. In this specification, schematic descriptions of the foregoing terms do not necessarily specific to a same embodiment or example. Besides, the described specific features or the characteristics may be combined in a proper manner in any one or more embodiments or examples. In addition, a person skilled in the art can integrate or combine different embodiments or examples that are described in this specification and features of the different embodiments or examples, in a case they are not mutually contradictory.

Any process or method in the flowcharts or described herein in another manner may be understood as indicating a module, a segment, or a part including code of one or more executable instructions for implementing a particular logical function or process step. In addition, the scope of preferred embodiments of this disclosure includes other implementations which do not follow the order shown or discussed, including performing, according to related functions, the functions basically simultaneously or in a reverse order, which is to be understood by a person skilled in the art to which the embodiments of this disclosure belong.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the context of this specification, a "computer-readable medium" may be any apparatus that can include, store, communicate, propagate, or transmit the program for use by the instruction execution system, apparatus, or device or in combination with the instruction execution system, apparatus, or device. More specific examples (a non-exhaustive list) of the computer readable medium include the following: an electronic connection portion (an electronic device) having one or more cable layouts, a portable computer diskette (a magnetic apparatus), a random access memory, a read-only memory, an erasable programmable read-only memory (EPROM or a flash), a fiber apparatus, and a portable compact disc read-only memory (CDROM). In addition, the computer readable medium may even be a piece of paper for printing the program, or another proper medium, because, for example, optical scanning may be performed on the paper or another medium, and then processing is performed by performing editing and decryption, or in another proper manner to obtain the program in an electronic manner. Then, the program is stored in a computer memory.

It is to be understood that parts of this disclosure may be implemented by using hardware, software, firmware, or combinations thereof. In the foregoing implementations, a plurality of steps or methods may be implemented by using software or firmware that are stored in a memory and are executed by a proper instruction execution system. For example, if implemented by hardware, as in another implementation, the plurality of steps or methods may be implemented by any one of following common technologies in the art or a combination thereof: a discrete logic circuit of a logic gate circuit for realizing a logic function for a data signal, an application specific integrated circuit having a suitable combined logic gate circuit, a programmable gate array (PGA), and a field programmable gate array (FPGA).

A person of ordinary skill in the art may understand that all or some of the steps of the method embodiments may be implemented by a program instructing relevant hardware. The program may be stored in a computer-readable storage medium. When the program is run, one or a combination of the steps of the method embodiments are performed.

In addition, the functional modules in the embodiments of this disclosure may be integrated into one processing module, or each of the units may exist alone physically, or two or more units may be integrated into one module. The integrated module may be implemented in a hardware form, or may be implemented in a form of a software functional module. If implemented in the form of software functional modules and sold or used as an independent product, the integrated module may also be stored in a computer-readable storage medium.

The aforementioned storage medium may be a read-only memory, a magnetic disk, or an optical disc. Although the embodiments of this disclosure are shown and described above, it can be understood that, the foregoing embodiments are exemplary, and cannot be construed as a limitation to this disclosure. Within the scope of this disclosure, a person of ordinary skill in the art may make changes, modifications, replacement, and variations to the foregoing embodiments.

What is claimed is:

1. A method for authentication information transmission, performed by a computing device hosting a key management client, the computing device comprising a hardware abstract layer, and the method comprising:
   opening the hardware abstract layer to an application client running in the computing device and associated with an application server, wherein the hardware abstract layer is pre-defined in advance;
   receiving, by the key management client through a path via a preset hardware abstract layer interface of the hardware abstract layer, authentication information transmitted by the application client, wherein the key management client is registered in the hardware abstract layer and the path does not need to be re-established following a system update of the computing device;
   transmitting, by the key management client, the authentication information to a key management server, so that the key management server transmits the authentication information to a trusted application in a trusted execution environment in the computing device, wherein the key management server is different from the application client;
   obtaining, by the key management client, authentication information signed by the trusted application and forwarded by the key management server; and
   transmitting, by the key management client through the preset hardware abstract layer interface, the signed authentication information to the application server, so that the application server performs a validity check on the authentication information.

2. The method according to claim 1, wherein before transmitting, by the key management client through the preset hardware abstract layer interface, the signed authentication information to the application server, the method further comprises:
   obtaining, by the key management client, a signature key value of the application server transmitted by the key management server, the signature key value being generated by the trusted application; and
   transmitting, by the key management client, the signature key value to the application server through the preset hardware abstract layer interface.

3. The method according to claim 1, wherein before transmitting, by the key management client, the authentication information to the key management server, the method further comprises:
   establishing, by the key management client, a link path between the key management client and the key management server in a hardware abstract layer in the computing device.

4. The method according to claim 3, wherein:
   the hardware abstract layer comprises an interface layer between an operating system kernel and a hardware circuit that is capable of interacting with the operating system kernel and the hardware circuit directly; and
   the key management client and the key management server are persistently pre-registered in the hardware abstract layer.

5. The method according to claim 4, wherein the link path comprises an interface defined by using a hardware abstract layer interface definition language.

6. The method according to claim 4, wherein transmitting, by the key management client, the authentication information to the key management server comprises:
   encapsulating, by the key management client, the authentication information as a hardware abstract layer interface instruction; and
   transmitting, by the key management client, the hardware abstract layer interface instruction to the key management server through the link path.

7. The method according to claim 1, further comprising:
receiving, by the key management client through the preset hardware abstract layer interface, an identifier of the application client corresponding to the authentication information transmitted by the application client,
   wherein before transmitting, by the key management client through the preset hardware abstract layer interface, the signed authentication information to the application server corresponding to the application client, the method further comprises determining, by the key management client according to the identifier of the application client, a target application server corresponding to the application client; and
   wherein transmitting, by the key management client through the preset hardware abstract layer interface, the signed authentication information to the application server corresponding to the application client comprises transmitting, by the key management client through the preset hardware abstract layer interface, the signed authentication information to the target application server.

8. The method according to claim 1, wherein before receiving, by the key management client through the preset hardware abstract layer interface, the authentication information transmitted by the application client, the method further comprises:
   transmitting, by the key management client, an identifier of the preset hardware abstract layer interface to the application client.

9. An apparatus for authentication information transmission, the apparatus hosting a key management client and comprising a hardware abstract layer, and the apparatus further comprising a memory for storing computer instructions and a processor in communication with the memory, wherein, when the processor executes the instructions, the processor is configured to cause the key management client to:
   open the hardware abstract layer to an application client running in the computing device and associated with an application server, wherein the hardware abstract layer is pre-defined in advance;
   receive through a path via a preset hardware abstract layer interface of the hardware abstract layer, authentication information transmitted by the application client, wherein the key management client is registered in the hardware abstract layer and the path does not need to be re-established following a system update of the apparatus;

transmit the authentication information to a key management server, so that the key management server transmits the authentication information to a trusted application in a trusted execution environment in the apparatus, wherein the key management server is different from the application client;

obtain authentication information signed by the trusted application and forwarded by the key management server; and transmit through the preset hardware abstract layer interface, the signed authentication information to the application server, so that the application server performs a validity check on the authentication information.

10. The apparatus according to claim 9, wherein, before the processor is configured to cause the key management client to transmit through the preset hardware abstract layer interface, the signed authentication information to the application server, the processor is configured to further cause the key management client to:

obtain a signature key value of the application server transmitted by the key management server, the signature key value being generated by the trusted application; and transmit the signature key value to the application server through the preset hardware abstract layer interface.

11. The apparatus according to claim 9, wherein, before the processor is configured to cause the key management client to transmit through the preset hardware abstract layer interface, the signed authentication information to the application server, the processor is configured to further cause the key management client to:

establish a link path between the key management client and the key management server in a hardware abstract layer in the apparatus.

12. The apparatus according to claim 11, wherein:

the hardware abstract layer comprises an interface layer between an operating system kernel and a hardware circuit that is capable of interacting with the operating system kernel and the hardware circuit directly; and the key management client and the key management server are persistently pre-registered in the hardware abstract layer.

13. The apparatus according to claim 12, wherein the link path comprises an interface defined by using a hardware abstract layer interface definition language.

14. The apparatus according to claim 12, wherein, when the processor is configured to cause the key management client to transmit the authentication information to the key management server, the processor is configured to cause the key management client to:

encapsulate the authentication information as a hardware abstract layer interface instruction; and transmit the hardware abstract layer interface instruction to the key management server through the link path.

15. The apparatus according to claim 9, wherein, when the processor executes the instructions, the processor is configured to further cause the key management client to:

receive, through the preset hardware abstract layer interface, an identifier of the application client corresponding to the authentication information transmitted by the application client;

wherein, before the processor is configured to cause the key management client to transmit through the preset hardware abstract layer interface, the signed authentication information to the application server corresponding to the application client, the processor is configured to further cause the key management client to: determine, according to the identifier of the application client, a target application server corresponding to the application client; and wherein, when the processor is configured to cause the key management client to transmit through the preset hardware abstract layer interface, the signed authentication information to the application server corresponding to the application client, the processor is configured to cause the key management client to: transmit through the preset hardware abstract layer interface, the signed authentication information to the target application server.

16. The apparatus according to claim 9, wherein, before the processor is configured to cause the apparatus to receive through the preset hardware abstract layer interface, the authentication information transmitted by the application client, the processor is configured to further cause the key management client to:

transmit an identifier of the preset hardware abstract layer interface to the application client.

17. A non-transitory storage medium for storing computer readable instructions, the computer readable instructions, when executed by a processor in a computing device hosting a key management client and comprising a hardware abstract layer, causing the key management client to:

open the hardware abstract layer to an application client running in the computing device and associated with an application server, wherein the hardware abstract layer is pre-defined in advance;

receive through a path via a preset hardware abstract layer interface of the hardware abstract layer, authentication information transmitted by the application client, wherein the key management client is registered in the hardware abstract layer and the path does not need to be re-established following a system update of the computing device;

transmit the authentication information to a key management server, so that the key management server transmits the authentication information to a trusted application in a trusted execution environment in the computing device, wherein the key management server is different from the application client;

obtain authentication information signed by the trusted application and forwarded by the key management server; and transmit through the preset hardware abstract layer interface, the signed authentication information to the application server, so that the application server performs a validity check on the authentication information.

18. The non-transitory storage medium according to claim 17, wherein, before the computer readable instructions cause the key management client to transmit through the preset hardware abstract layer interface, the signed authentication information to the application server, the computer readable instructions further cause the key management client to:

obtain a signature key value of the application server transmitted by the key management server, the signature key value being generated by the trusted application; and transmit the signature key value to the application server through the preset hardware abstract layer interface.

19. The non-transitory storage medium according to claim 17, wherein, before the computer readable instructions cause the key management client to transmit the authentication information to the key management server, the computer readable instructions further cause the key management client to:
- establish a link path between the key management client and the key management server in a hardware abstract layer in the computing device.

20. The non-transitory storage medium according to claim 19, wherein:
- the hardware abstract layer comprises an interface layer between an operating system kernel and a hardware circuit that is capable of interacting with the operating system kernel and the hardware circuit directly;
- the key management client and the key management server are persistently pre-registered in the hardware abstract layer.

\* \* \* \* \*